(12) United States Patent
Konta et al.

(10) Patent No.: US 11,910,084 B2
(45) Date of Patent: Feb. 20, 2024

(54) ELECTRONIC APPARATUS, CONTROL METHOD, AND NON-TRANSITORY COMPUTER READABLE MEDIUM

(71) Applicant: CANON KABUSHIKI KAISHA, Tokyo (JP)

(72) Inventors: Miho Konta, Kanagawa (JP); Takashi Hasegawa, Tokyo (JP); Ippei Uchida, Tokyo (JP); Satsuki Tomizawa, Kanagawa (JP); Toshimichi Ise, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/872,733

(22) Filed: Jul. 25, 2022

(65) Prior Publication Data

US 2023/0032567 A1  Feb. 2, 2023

(30) Foreign Application Priority Data

Jul. 30, 2021  (JP) ................. 2021-125971

(51) Int. Cl.
*H04N 23/65* (2023.01)
*H04N 23/63* (2023.01)
*H04N 23/667* (2023.01)

(52) U.S. Cl.
CPC ......... *H04N 23/651* (2023.01); *H04N 23/633* (2023.01); *H04N 23/667* (2023.01)

(58) Field of Classification Search
CPC ... H04N 23/651; H04N 23/633; H04N 23/667
See application file for complete search history.

(56) References Cited

U.S. PATENT DOCUMENTS

2005/0231167 A1* 10/2005 Kubota ............. G01R 31/3648
320/132
2008/0030169 A1* 2/2008 Kamishima ........ G01R 31/3828
320/134
(Continued)

FOREIGN PATENT DOCUMENTS

JP   2000-350371 A   12/2000
JP   2005-293519 A   10/2005
(Continued)

*Primary Examiner* — Timothy J Henn
(74) *Attorney, Agent, or Firm* — Cowan, Liebowitz & Latman, P.C.

(57) ABSTRACT

An electronic apparatus according to the present invention sets a power mode of the electronic apparatus from among a plurality of power modes including a first power mode and a second power mode having maximum power consumption lower than maximum power consumption of the first power mode; determines, on a basis of a present power mode, a calculation method for calculating a remaining time which is a remaining usable time of the electronic apparatus; acquires the remaining time from information on a remaining amount of a battery supplying power to the electronic apparatus; switches from the second power mode to the first power mode according to an instruction from a user if a switching condition for switching to the first power mode is satisfied; and does not switch from the second power mode to the first power mode according to the instruction if the switching condition is not satisfied.

16 Claims, 8 Drawing Sheets

(56) References Cited

U.S. PATENT DOCUMENTS

| | | | |
|---|---|---|---|
| 2012/0189264 A1* | 7/2012 | Okazaki | H04N 23/633 386/E5.069 |
| 2014/0257726 A1* | 9/2014 | Baba | G01R 31/3832 702/63 |
| 2016/0014314 A1* | 1/2016 | Laroia | H04N 23/11 348/273 |
| 2016/0070330 A1* | 3/2016 | Yang | H04W 52/0277 713/320 |
| 2017/0142339 A1* | 5/2017 | Kim | H04N 23/65 |
| 2019/0072616 A1* | 3/2019 | Matsushita | G01R 31/374 |

FOREIGN PATENT DOCUMENTS

| | | |
|---|---|---|
| JP | 2008-187234 A | 8/2008 |
| JP | 2016-103748 A | 6/2016 |

\* cited by examiner

ELECTRONIC APPARATUS, CONTROL METHOD, AND NON-TRANSITORY COMPUTER READABLE MEDIUM

BACKGROUND OF THE INVENTION

Field of the Invention

The present disclosure relates to an electronic apparatus, a control method, and a non-transitory computer readable medium.

Description of the Related Art

Japanese Patent Application Laid-open No. 2008-187234 describes a method for calculating a used power amount corresponding to the use of an electronic apparatus and displaying the number of photographable sheets on the basis of the total capacity of a battery and the used power amount.

In some cases, the minimum operating voltages (hereinafter called the reference voltages) of batteries are increased according to the maximum power consumption of electronic apparatuses. The increase in the reference voltages of the batteries leads to an increase in the maximum power supply of the batteries. As a result, it is possible to cover the maximum power consumption of the electronic apparatuses by the power of the batteries.

The electronic apparatuses end their driving when the battery voltages drop to the reference voltages. Accordingly, when the reference voltages are increased, the usable time allowing the electronic apparatuses is shortened.

SUMMARY OF THE INVENTION

The present disclosure has been made in view of the above problem and provides a technique to suppress the shortening of the usable time of an electronic apparatus.

A first aspect of the present disclosure provides an electronic apparatus including: at least one processor; and at least one memory storing a program which, when executed by the at least one processor, causes the electronic apparatus to function as: a setting unit configured to set a power mode of the electronic apparatus from among a plurality of power modes including a first power mode and a second power mode having maximum power consumption lower than maximum power consumption of the first power mode; a determination unit configured to determine, on a basis of a present power mode set by the setting unit, a calculation method for calculating a remaining time which is a remaining usable time of the electronic apparatus; and an acquisition unit configured to acquire the remaining time of the electronic apparatus from information on a remaining amount of a battery acquired from the battery supplying power to the electronic apparatus by using the calculation method determined by the determination unit, wherein the setting unit performs switching of the power mode from the second power mode to the first power mode according to an instruction from a user in a case where a switching condition for switching to the first power mode is satisfied, and does not perform the switching of the power mode from the second power mode to the first power mode according to the instruction in a case where the switching condition for switching to the first power mode is not satisfied.

A second aspect of the present disclosure provides a control method for controlling an electronic apparatus, the method including: setting a power mode of the electronic apparatus from among a plurality of power modes including a first power mode and a second power mode having maximum power consumption lower than maximum power consumption of the first power mode; determining, on a basis of a present power mode set in the setting, a calculation method for calculating a remaining time which is a remaining usable time of the electronic apparatus; and acquiring the remaining time of the electronic apparatus from information on a remaining amount of a battery acquired from the battery supplying power to the electronic apparatus by using the calculation method determined in the determining, wherein in the setting, switching of the power mode from the second power mode to the first power mode according to an instruction from a user is performed in a case where a switching condition for switching to the first power mode is satisfied, and the switching of the power mode from the second power mode to the first power mode according to the instruction is not performed in a case where the switching condition for switching to the first power mode is not satisfied.

A third aspect of the present disclosure provides A non-transitory computer readable medium that stores a program, wherein the program causes a computer to execute a control method of an electronic apparatus, the control method including: setting a power mode of the electronic apparatus from among a plurality of power modes including a first power mode and a second power mode having maximum power consumption lower than maximum power consumption of the first power mode; determining, on a basis of a present power mode set in the setting, a calculation method for calculating a remaining time which is a remaining usable time of the electronic apparatus; and acquiring the remaining time of the electronic apparatus from information on a remaining amount of a battery acquired from the battery supplying power to the electronic apparatus by using the calculation method determined in the determining, wherein in the setting, switching of the power mode from the second power mode to the first power mode according to an instruction from a user is performed in a case where a switching condition for switching to the first mode is satisfied, and the switching of the power mode from the second power mode to the first power mode according to the instruction is not performed in a case where the switching condition for switching to the first power mode is not satisfied.

Further features of the present invention will become apparent from the following description of exemplary embodiments with reference to the attached drawings.

DESCRIPTION OF THE EMBODIMENTS

First Embodiment

Hereinafter, an embodiment of the present disclosure will be described with reference to the drawings. An electronic apparatus according to the present disclosure may only be, for example, an electronic apparatus such as a digital video camera, a digital still camera, a smart phone, and a personal computer that operates with an electrical battery (hereinafter called a battery).

The power consumption of electronic apparatuses such as cameras has been on the increase due to the influence of the addition of new functions or the like. Meanwhile, it has been demanded that the batteries of the cameras be reduced in size and weight and be optimized in development cost. Therefore, newly-developed batteries are not necessarily optimum, and conventional products have been generally used in many cases. When the conventional batteries are used, the maximum power supply of the batteries may fall below the maximum power consumption of the cameras. In order to prevent the maximum power supply of the batteries from falling below the maximum power consumption of the cameras, the minimum operating voltages (reference voltages) of the batteries are increased. The increase in the reference voltages of the batteries leads to an increase in the maximum power supply of the batteries. As a result, it is possible to cover the maximum power consumption of the electronic apparatuses by the power of the batteries.

Figure 3:
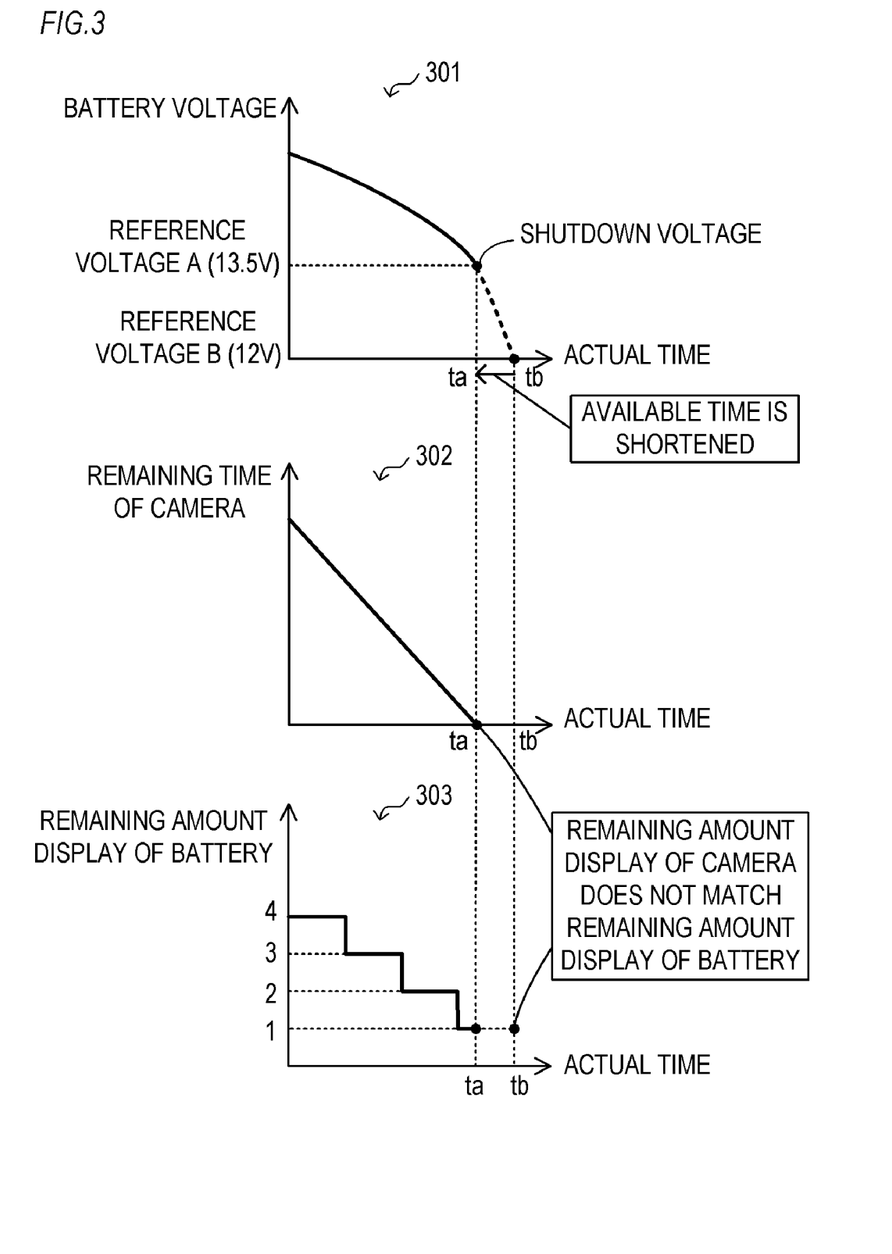
FIG. 3 is a diagram for describing an adverse effect caused when a reference voltage is increased.

Using FIG. 3, the states of a camera and a battery when the reference voltage of the battery that supplies power to the camera is increased will be described. In FIG. 3, a graph 301 is a graph showing a change in a battery voltage relative to the actual operating time (actual time) of the camera. A vertical axis shows the battery voltage, and a horizontal axis shows the actual time. The remaining usable time (hereinafter also called the remaining time) of the camera is calculated so as to become zero when the battery voltage drops to the reference voltage. When the remaining time of the camera becomes zero, the camera ends its driving (shuts down).

When the reference voltage is increased from a reference voltage B (12 V) to a reference voltage A (13.5 V) to cover maximum power consumption, the remaining time of the camera becomes zero when the battery voltage drops to the reference voltage A. Therefore, the remaining time becomes zero at a time ta, and the camera shuts down. With the reference voltage B, the camera shuts down at a time tb. Therefore, when the reference voltage is increased to the reference voltage A, the usable time of the camera is shortened by tb−ta.

In FIG. 3, a graph 302 is a graph showing the duration of usable time (remaining time) of the camera relative to the actual operating time (actual time) of the camera. A vertical axis shows the remaining time of the camera, and a horizontal axis shows the actual time. When the reference voltage of the battery is increased from the reference voltage B to the reference voltage A, the remaining time of the camera is calculated so as to become zero at the time ta.

In FIG. 3, a graph 303 is a graph showing the remaining amount display of the battery relative to the actual operating time (actual time) of the camera. A vertical axis shows the remaining amount display of the battery, and a horizontal axis shows the actual time. The remaining amount of the battery is displayed on a display unit provided in the battery itself in some cases. The remaining amount of the battery is displayed through, for example, a mark, a lamp, an LED display, or the like. In the example of the graph 303, the remaining amount of the battery is displayed at the four levels of 1 to 4.

Even when the reference voltage is increased to the reference voltage A, the remaining amount display of the battery is set on the basis of the time tb at which the battery voltage becomes the reference voltage B. On the other hand, when the reference voltage is increased to the reference voltage A, the remaining time of the camera is calculated on the basis of the reference voltage A. Accordingly, the remaining amount display of the battery does not match the remaining amount display displayed on the camera (the remaining amount display corresponding to the remaining time of the camera).

When the reference voltage of a battery used in an electronic apparatus such as a camera is increased as described in FIG. 3, the shortening of the usable time of the electronic apparatus and the mismatch between the remaining amount display of the battery and the remaining amount display of the electronic apparatus may occur. In the first embodiment, an electronic apparatus switches a calculation method for calculating a remaining time according to power consumption to make it possible to appropriately calculate the remaining time and reduce the mismatch between the remaining amount display of a battery and the remaining amount display of the electronic apparatus.

Figure 1:
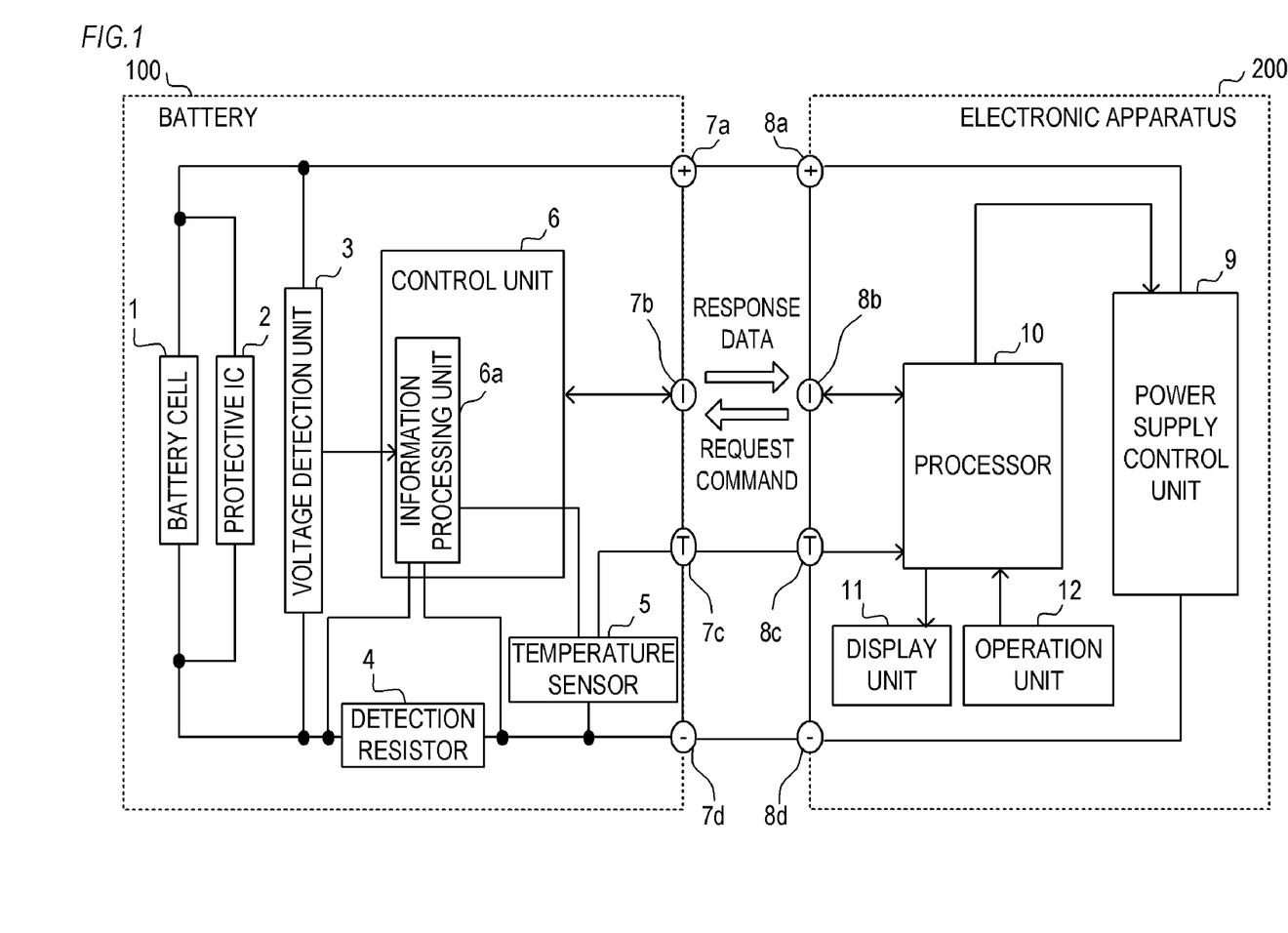
FIG. 1 is a block diagram for describing the configurations of a battery 100 and an electronic apparatus 200 in a first embodiment.

FIG. 1 is a block diagram showing a configuration example of a battery 100 and an electronic apparatus 200 in the first embodiment. The battery 100 and the electronic apparatus 200 are connected to each other when contacts 7a to 79d of the battery 100 are connected to contacts 8a to 8d of the electronic apparatus 200, respectively. The battery 100 supplies power to the electronic apparatus 200 via the contacts 7a, 8a, 7d, and 8d.

Configurations provided in the battery 100 will be described. A battery cell 1 is a charging-type battery cell and generates an electromotive force. A protective IC (Integrated Circuit) 2 is a circuit that controls the protective function of the battery cell 1 during charging and discharging. A voltage detection unit 3 detects a voltage (battery voltage) between the terminals of the battery cell 1. A detection resistor 4 detects a discharging current (battery current). A temperature sensor 5 detects a battery temperature. The temperature sensor 5 is, for example, a thermistor or a thermocouple.

An information processing unit 6a inside a control unit 6 acquires information detected by the voltage detection unit 3, the detection resistor 4, and the temperature sensor 5 and performs the A/D conversion of the acquired information. The information processing unit 6a performs processing to integrate currents since the start of use on the basis of the values of acquired voltages or currents. The battery 100 may be equipped with an LED display unit (not shown) that shows the remaining amount of the battery. The remaining amount display of the battery 100 is controlled by the control unit 6. Besides the remaining amount display of the electronic apparatus 200, the battery 100 is able to display the remaining amount of the battery 100 on the LED display unit.

Configurations provided in the electronic apparatus 200 will be described. A power supply control unit 9 generates a voltage used in the electronic apparatus 200 from a power supply supplied from the battery 100 and supplies power to the constituting elements of the electronic apparatus 200. The power supply control unit 9 is, for example, a circuit including a DC/DC converter or a linear regulator.

A processor 10 controls the respective constituting elements of the electronic apparatus 200. The processor 10 communicates with the battery 100 via the contacts 8b and 7b and transmits a request command to the control unit 6. The processor 10 receives remaining amount information on the battery 100 including a battery remaining amount (remaining capacity), a battery voltage, a battery current, or the like as response data via the contacts 7b and 8b. The processor 10 acquires the remaining usable time of the electronic apparatus 200 using the remaining amount information from the battery 100. Further, the processor 10 receives information on the battery temperature of the battery 100 from the temperature sensor 5 via the contacts 7c and 8c.

A display unit 11 displays information on the electronic apparatus 200 such as a remaining time, moving image data, or the like. The display unit 11 is, for example, a liquid crystal display. An operation unit 12 receives an operation from a user. The operation unit 12 is, for example, a switch or a button and may be a touch panel integrated with the display unit 11. The processor 10 controls the constituting elements of the electronic apparatus 200 according to input information from the operation unit 12.

Figure 2:
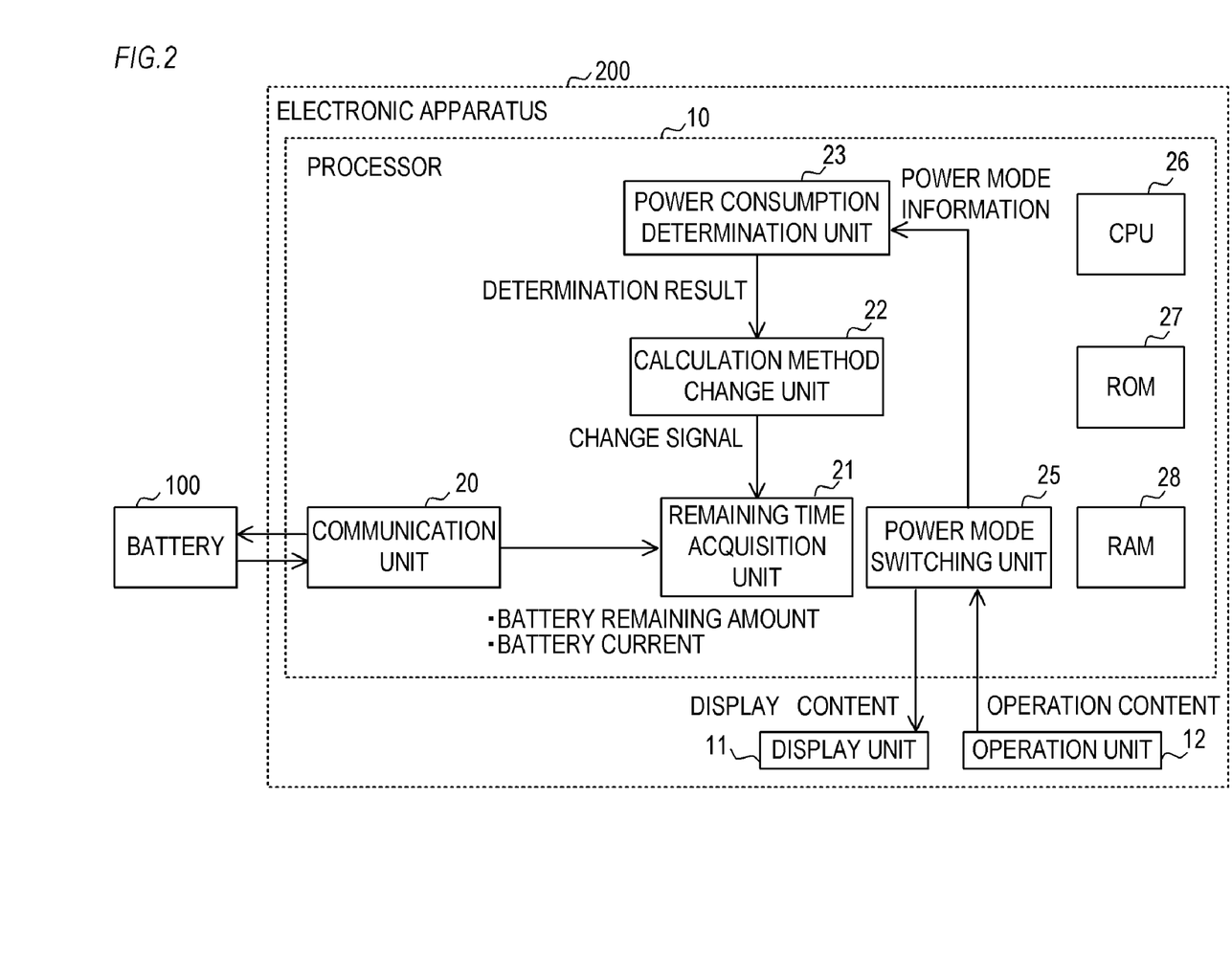
FIG. 2 is a block diagram for describing some of the configurations of the electronic apparatus 200 in the first embodiment.

FIG. 2 is a block diagram showing a configuration example of the electronic apparatus 200 in the first embodiment. FIG. 2 is a diagram describing in detail the processor 10 among the respective configurations of the electronic apparatus 200 shown in FIG. 1. A CPU 26 provided in the processor 10 is responsible for controlling the respective blocks of the processor 10 via a bus not shown. A ROM 27 stores a program that is executed by the CPU 26. A partial area of the ROM 27 is used as a backup to maintain the state of the electronic apparatus 200 or the like. A RAM 28 is a volatile memory that is used as temporary storage of the CPU 26.

The CPU 26 executes a program that is read from the ROM 27 or a recording medium serving as a non-volatile memory into the RAM 28 to cause the electronic apparatus 200 to realize the functions of a communication unit 20, a remaining time acquisition unit 21, a calculation method change unit 22, a power consumption determination unit 23, and a power mode switching unit 25. Further, the CPU 26 performs control so that the electronic apparatus 200 ends its operation when the remaining time of the electronic apparatus 200 becomes zero. The communication unit 20 receives remaining amount information on the battery 100 including a battery remaining amount and a battery current through communication with the battery 100.

The remaining time acquisition unit 21 acquires the remaining time of the electronic apparatus 200 on the basis of information on a battery remaining amount and information on a battery current that are acquired from the battery 100. A calculation method for calculating the remaining time by the remaining time acquisition unit 21 is determined on the basis of information from the calculation method change unit 22. The acquired remaining time of the electronic apparatus 200 is output to and displayed on the display unit 11 via a signal line.

The calculation method change unit 22 determines a calculation method for calculating a remaining time on the basis of the determination result of the power consumption of the electronic apparatus 200 that is output from the power consumption determination unit 23. The calculation method change unit 22 outputs information on the determined calculation method for calculating the remaining time to the remaining time acquisition unit 21.

The power consumption determination unit 23 determines the power consumption of the electronic apparatus 200. The power consumption determination unit 23 is able to determine the power consumption on the basis of power mode information from the power mode switching unit 25. The electronic apparatus 200 has a plurality of power modes having different maximum power consumption. Since available functions are different between the respective power modes, the maximum power consumption in the respective power modes is acquired on the basis of the functions available in the respective modes. The power consumption determination unit 23 outputs the determination result of the power consumption of the electronic apparatus 200 to the calculation method change unit 22.

Note that the power consumption determination unit 23 may determine the power modes according to other methods. For example, the power consumption determination unit 23 calculates the power consumption of the electronic apparatus 200 from the product of a battery voltage and a battery current that are acquired from the battery 100 via the communication unit 20. Then, the power consumption determination unit 23 may compare the calculated power consumption with a power consumption table stored in advance in the ROM 27 to determine a present power mode. Note that the power consumption table is a table showing the corresponding relationship between the power consumption and the power modes of the electronic apparatus 200.

The power mode switching unit 25 receives a signal showing an operation content for switching a power mode from the operation unit 12 and switches the power mode on the basis of the received signal. For example, when the display unit 11 displays the respective power modes of the electronic apparatus 200 and a user selects a desired power mode via the operation unit 12, an operation content is transmitted to the power mode switching unit 25. The power mode switching unit 25 switches a power mode on the basis of a user's operation and outputs information on a switched power mode to the power consumption determination unit 23.

Note that the display unit 11 may display, instead of respective power mode names, a user interface for causing the user to select the ON and OFF of a power saving mode. When the power saving mode is set to be turned ON from OFF by the user, the power mode switching unit 25 outputs information showing that a switched power mode is the power saving mode to the power consumption determination unit 23.

Figure 4:
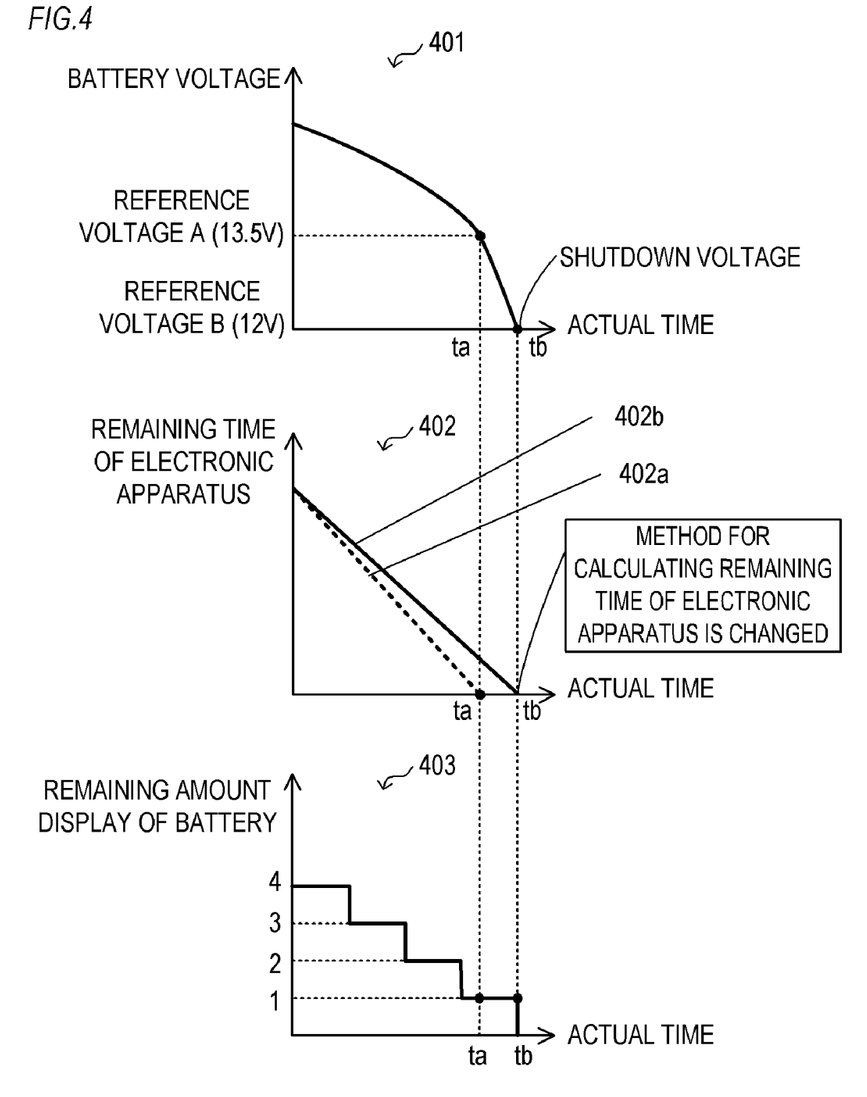
FIG. 4 is a diagram for describing a method for switching a calculation formula for the remaining amount display of the electronic apparatus 200 in the first embodiment.

A change in the calculation method for calculating the remaining time of the electronic apparatus 200 will be described with reference to FIG. 4. In FIG. 4, a graph 401 is a graph showing a change in a battery voltage relative to the actual operating time (actual time) of the electronic apparatus 200. A vertical axis shows the battery voltage, and a horizontal axis shows the actual time.

When a reference voltage is increased to a reference voltage A (13.5 V) along with an increase in power consumption, the actual time of the electronic apparatus 200 is shortened to ta as shown in FIG. 3. In the power saving mode, the electronic apparatus 200 restricts available functions to reduce its power consumption. The reduction in the power consumption of the electronic apparatus 200 allows a reduction in the reference voltage of the electronic apparatus 200. In the power saving mode, the electronic apparatus 200 sets the reference voltage at a reference voltage B (12 V) to comply with the power saving mode and determines the calculation method for calculating the remaining time as follows. Accordingly, the remaining time is calculated so as to become zero when the battery voltage drops to the reference voltage B, and the electronic apparatus 200 is allowed to delay its shutdown until the actual time becomes tb.

The electronic apparatus 200 has a plurality of power mode having different maximum power consumption and is allowed to change the reference voltage according to the power consumption of the respective power modes. The maximum power consumption of the respective power modes is different depending on functions available in the respective power modes. The power modes of the electronic apparatus 200 include, for example, a normal mode and the power saving mode having maximum power consumption smaller than that of the normal mode. The power saving mode refers to an operating state in which the available functions are restricted to reduce the maximum power consumption of the electronic apparatus 200 in comparison with the normal mode. A user is only required to turn on the power saving mode when he/she wants to increase the remaining time of the electronic apparatus 200. The normal mode corresponds to a "first power mode," and the power saving mode corresponds to a "second power mode".

In the power saving mode, some of the functions of the electronic apparatus 200 are disabled. In the power saving mode, at least one of the functions available in the normal mode may be disabled. For example, the electronic apparatus 200 disables functions such as the high brightness setting of the backlight of the display unit and a network function in the power saving mode. Further, the processing contents of the respective functions of the electronic apparatus 200 may be changed to reduce the processing load of the processor 10 in the power saving mode. When the electronic apparatus 200 operates in the normal mode, the user is allowed to increase the remaining time of the electronic apparatus 200 by turning on the power saving mode.

The calculation method for calculating the usable time (remaining time) of the electronic apparatus 200 will be described with reference to a graph 402 in FIG. 4. The graph 402 is a graph showing the remaining time of the electronic apparatus 200 relative to the actual operating time (actual time) of the electronic apparatus 200. A vertical axis shows the remaining time of the electronic apparatus 200, and a horizontal axis shows the actual time. The electronic apparatus 200 changes the calculation method according to a present power mode to calculate the remaining time of the electronic apparatus 200.

The power consumption determination unit 23 determines the maximum power consumption of the electronic apparatus 200 in a present power mode on the basis of power mode information received from the power mode switching unit 25. The calculation method change unit 22 determines the calculation method for calculating the remaining time of the electronic apparatus 200 on the basis of the determination result of the power consumption determination unit 23.

The calculation method change unit 22 determines a coefficient (hereinafter called a correction coefficient) used to calculate the remaining time of the electronic apparatus 200 according to power consumption in the present power mode. The correction coefficient is a coefficient used to correct the remaining time so that the remaining time of the electronic apparatus 200 becomes zero when the voltage of the battery 100 drops to a reference voltage. By the determination of the correction coefficient based on the present power mode of the electronic apparatus 200, the remaining time before the voltage of the battery 100 drops to the reference voltage corresponding to the present power mode is acquired. The calculation method change unit 22 is allowed to output information showing the determined correction coefficient to, for example, the remaining time acquisition unit 21.

When the correction coefficient in the normal mode is k1 and the correction coefficient in the power saving mode is k2, the remaining time acquisition unit 21 is able to calculate the remaining time of the electronic apparatus 200 according to the following Formulae (Formula 1) and (Formula 2).

$$T = \{C \times k1/I\} \times 60 \quad \text{(Formula 1)}$$

$$T = \{C \times k2/I\} \times 60 \quad \text{(Formula 2)}$$

T represents the remaining time [minute] of the electronic apparatus 200. C represents a battery remaining amount [mAh]. I represents a battery current [mA]. The battery remaining amount and the battery current are acquired from the battery 100 as remaining amount information.

As described above, the reference voltage corresponding to the normal mode is set according to the maximum power consumption in the normal mode, and the reference voltage corresponding to the power saving mode is set according to the maximum power consumption in the power saving mode. Further, the value of the correction coefficient k1 is a value considering the reference voltage corresponding to the normal mode, and the value of the correction coefficient k2 is a value considering the reference voltage corresponding to the power saving mode.

In a graph 402, a graph 402a shown by dotted lines is a graph of the remaining time when the correction coefficient k1 is used, and the remaining time becomes zero at an actual time ta. A graph 402b shown by a solid line is a graph of the remaining time when the correction coefficient k2 is used, and the remaining time becomes zero at an actual time tb.

In FIG. 4, a graph 403 is a graph showing the remaining amount display of the battery relative to the actual operating time (actual time) of the electronic apparatus 200 like the graph 303 in FIG. 3. A vertical axis shows the remaining amount display of the battery, and a horizontal axis shows the actual time. Since the electronic apparatus 200 changes the calculation method to (Formula 2) in the power saving mode, the remaining time becomes zero at the actual time tb as shown in the graph 402b. Accordingly, the mismatch between the remaining amount display of the battery and the remaining amount display of the electronic apparatus 200 is solved.

As described above, the correction coefficients used to calculate the remaining times are switched according to the power modes, whereby the remaining times adapted to the reference voltages corresponding to the power modes are calculated. Therefore, the electronic apparatus 200 is able to increase its remaining time in a power mode having small power consumption. Further, it is possible to make the display of the remaining time displayed on the electronic apparatus 200 match the display of the remaining amount of the battery 100.

Note that the number of the power modes of the electronic apparatus 200 is not limited to two but may be at least three. In the case of at least three power modes, the electronic apparatus 200 is allowed to acquire a remaining time corresponding to power consumption by changing a correction coefficient for each of the modes. Further, the values of the reference voltages corresponding to the respective power modes are given as an example and are only required to be set on the basis of power consumption in the respective power modes. Further, the power consumption in the respective power modes may be maximum power consumption in the power modes. Further, the correction coefficients are not necessarily changed on the basis of a present power mode but may be changed on the basis of the present power consumption of the electronic apparatus 200.

The electronic apparatus 200 is allowed to suppress the shortening of the usable time of the electronic apparatus 200 by changing the calculation method for calculating the remaining time of the electronic apparatus 200 according to the power modes or power consumption. Further, it is possible to reduce the mismatch between the remaining amount display of the battery and the remaining amount display of the electronic apparatus.

Second Embodiment

In a second embodiment, an electronic apparatus performs control to change or maintain a power mode according to whether a switching condition relating to the switching of the power mode is satisfied. Thus, when the power mode is switched to a power mode having higher power consumption, the electronic apparatus is able to prevent its shutdown immediately after the switching of the power mode due to the shortage of power supplied from a battery.

Figure 5:
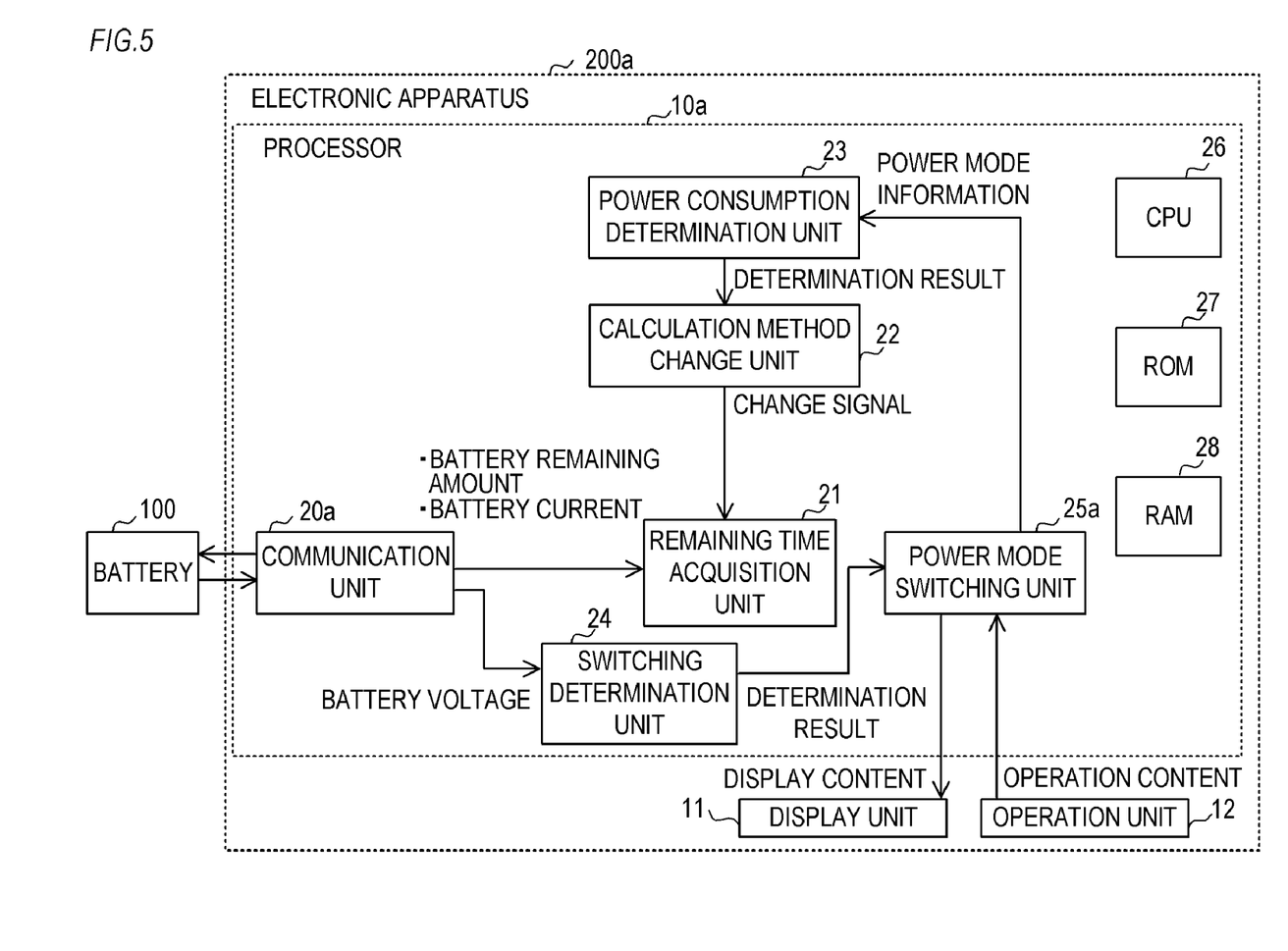
FIG. 5 is a block diagram for describing some of the configurations of an electronic apparatus 200a in a second embodiment.

Some of the configurations of an electronic apparatus 200a in the second embodiment will be described with reference to FIG. 5. Matters that will not be mentioned as the configurations and operations of the second embodiment conform to those of the first embodiment. In the second embodiment, the processor 10, the communication unit 20, and the power mode switching unit 25 in the first embodiment are replaced by a processor 10a, a communication unit 20a, and a power mode switching unit 25a, respectively.

In the second embodiment, the electronic apparatus 200a further has a switching determination unit 24. The switching determination unit 24 determines whether any of the remaining time of the electronic apparatus 200a, the remaining amount of a battery, and a battery voltage satisfies a switching condition for switching to a power mode having power consumption higher than that of a present power mode. On the basis of the determination result of the switching determination unit 24, the power mode switching unit 25a performs control whether to switch a power mode according to instructions to switch to a power mode having power consumption higher than that of a present power mode (for example, from a power saving mode to a normal mode) from a user. When the switching determination unit 24 determines that a switching condition for switching to the normal mode is satisfied, the power mode switching unit 25a performs the switching of the power mode to the normal mode according to the instructions to switch from the power saving mode to the normal mode from the user. When the switching determination unit 24 determines that the switching condition is not satisfied, the power mode switching unit 25a does not perform the switching of the power mode from the power saving mode to the normal mode according to the instructions from the user. When the switching determination unit 24 determines that the switching condition is not satisfied, an operation unit 12 may not receive the instructions to switch from the power saving mode to the normal mode.

Further, the power mode switching unit 25a outputs a display content including information on a power mode to a display unit 11 according to the determination result of the switching determination unit 24. The operation unit 12 outputs an operation content selected and operated by the user to the power mode switching unit 25a. Here, the display unit 11 displays a power mode, which is determined as being not satisfying the switching condition by the switching determination unit 24, as a state that is not selectable through the operation unit 12. Since the operation unit 12 does not receive the selection of the power mode not satisfying the switching condition, the electronic apparatus 200a is able to prevent its shutdown immediately after the switching of the power mode due to the shortage of power supplied from the battery. The power mode switching unit 25a outputs a power mode selected by the user to a power consumption determination unit 23 as power mode information. A remaining time is calculated according to the method described in the first embodiment. A CPU 26 ends the driving of the electronic apparatus 200a on the basis of a remaining time acquired by a remaining time acquisition unit 21. Note that the CPU 26 may end the driving of the electronic apparatus 200a on the basis of a battery remaining amount (reference capacity) or a battery voltage (reference voltage) that is set in advance.

Figure 6:
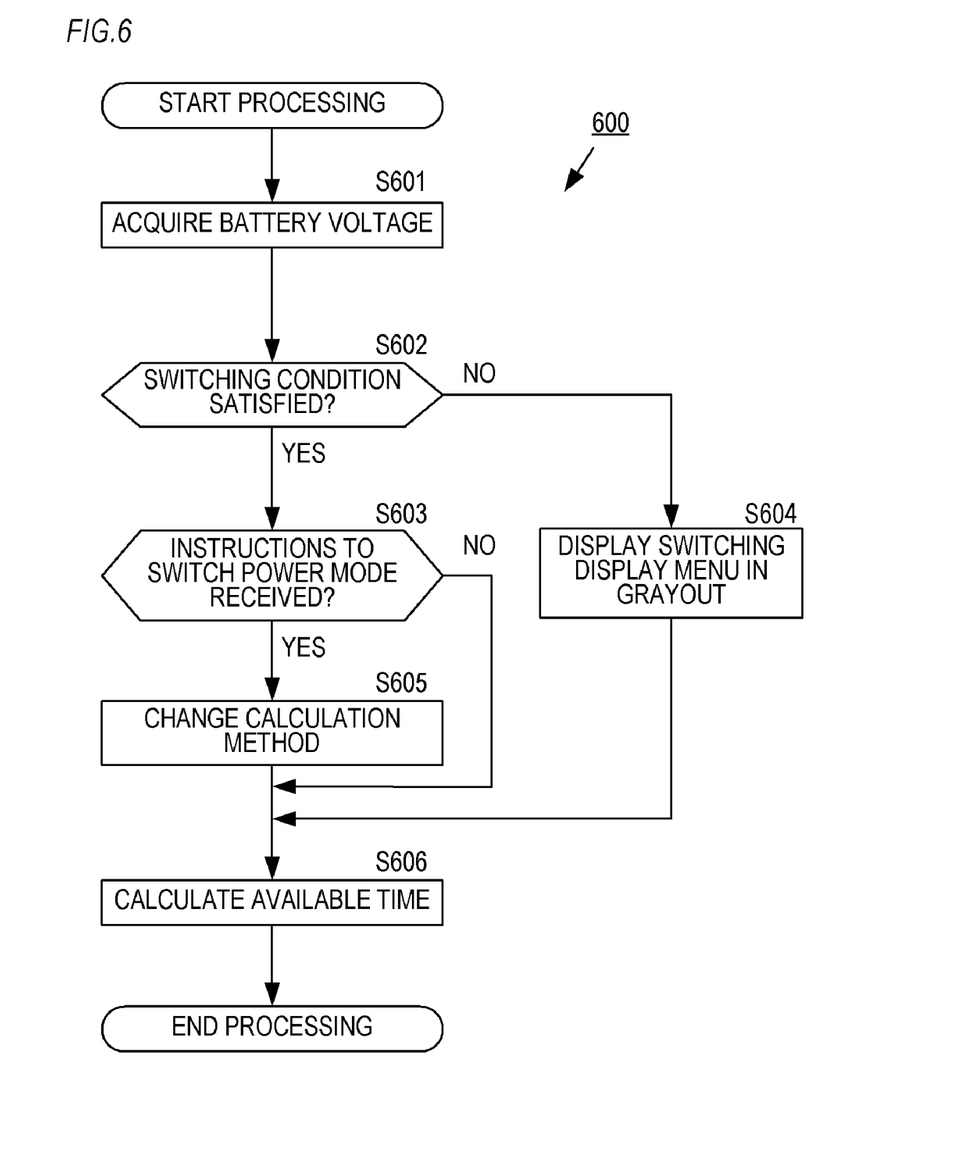
FIG. 6 is a flowchart for describing display switching processing 600 for a power mode.

FIG. 6 is a flowchart describing display switching processing 600 for a power mode. The display switching processing 600 starts when the power supply of the electronic apparatus 200a is turned on.

In step S601, the communication unit 20a acquires a battery voltage from the battery 100. Note that the battery voltage is acquired at, for example, every prescribed interval.

In step S602, the switching determination unit 24 determines whether the battery voltage acquired in step S601 satisfies a switching condition for switching from the power saving mode to the normal mode. Note that the switching determination unit 24 determines that the switching condition is satisfied as for switching from the normal mode to the power saving mode. The processing proceeds to step S603 when the battery voltage satisfies the switching condition for switching to the normal mode. Otherwise, the processing proceeds to step S604.

Figure 7:
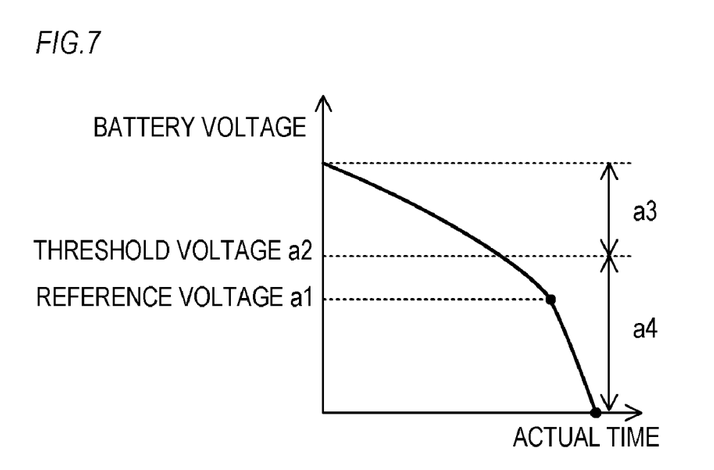
FIG. 7 is a diagram for describing the determination of a power mode switching condition when the electronic apparatus 200a has two power modes.

Here, the switching condition for switching to the normal mode will be described with reference to FIG. 7. The switching condition for switching to the normal mode includes, for example, any of a condition that a battery voltage is at least a threshold voltage, a condition that a battery remaining amount is at least a threshold capacity, and a condition that a remaining time is at least a threshold remaining time. Note that the switching determination unit 24 may combine a plurality of conditions among the three conditions together and determine whether the combined conditions are satisfied. Each of the conditions will be described below.

When the switching condition is the condition that the battery voltage is at least a threshold voltage, the switching determination unit 24 compares the battery voltage acquired by the communication unit 20a with a threshold voltage stored in advance in a ROM 27. The switching determination unit 24 determines that the switching condition is satisfied when the battery voltage is at least the threshold voltage. The switching determination unit 24 determines that the switching condition is not satisfied when the battery voltage is less than the threshold voltage.

The determination of the switching condition based on a battery voltage will be described with reference to FIG. 7. FIG. 7 is a graph showing a change in the battery voltage relative to the actual operating time (actual time) of the electronic apparatus 200a. A vertical axis shows the battery voltage, and a horizontal axis shows the actual time. In the normal mode, the remaining time of the electronic apparatus 200a is calculated so as to become zero when the battery voltage drops to a reference voltage a1. The electronic apparatus 200a ends its driving (shuts down) when the remaining time of the electronic apparatus 200a becomes zero. A threshold voltage a2 is a value different from the value of the reference voltage a1 and set at a value higher than the value of the reference voltage a1. The switching determination unit 24 determines that the switching condition for switching to the normal mode is satisfied when the battery voltage is at least the threshold voltage a2 (falls within the range of a3 in FIG. 7). The switching determination unit 24 determines that the switching condition for switching to the normal mode is not satisfied when the battery voltage is less than the threshold voltage (falls within the range of a4 in FIG. 7).

By setting a value higher than the reference voltage corresponding to the normal mode as the value of the threshold voltage, the following effect is, for example, obtained. If the value of the threshold voltage is set to be the same as the value of the reference voltage corresponding to the normal mode, it is determined that the switching condition for switching from the power saving mode to the normal mode is satisfied in a state in which the battery voltage is equal to the reference voltage. The reference voltage corresponding to the power saving mode is lower than the reference voltage corresponding to the normal mode. Therefore, in the power saving mode, the remaining time does not become zero in a state in which the battery voltage is equal to the reference voltage corresponding to the normal mode.

However, the remaining time is calculated as zero when the power saving mode is switched to the normal mode in a state in which the battery voltage is equal to the reference voltage corresponding to the normal mode. Accordingly, the electronic apparatus 200a immediately shuts down at a timing at which the power mode is changed to the normal mode. Therefore, the change of the power mode to the normal mode is pointlessly for a user. In view of this, the threshold voltage is only required to be set at a value higher than the value of the reference voltage corresponding to the normal mode. As a result of setting the threshold voltage at a value higher than the value of the reference voltage corresponding to the normal mode, the switching determination unit 24 determines that the switching condition for switching from the power saving mode to the normal mode is not satisfied in a state in which the battery voltage is equal to the reference voltage corresponding to the normal mode. Since the power mode switching unit 25a does not perform the switching of the power mode from the power saving mode to the normal mode according to the instructions from the user, the electronic apparatus 200a is able to prevent its shutdown immediately after the switching to the normal mode due to the shortage of power supplied from the battery.

The threshold voltage may be, for example, one obtained by adding an offset voltage, which is based on the minimum operating time (the time required for the electronic apparatus 200a to operate until the end of its driving) of the electronic apparatus 200a after the power mode is switched to the normal mode, to the reference voltage. More specifically, the offset voltage may be determined on the basis of the operating time of the electronic apparatus 200a before the battery voltage in the normal mode reduces from the threshold voltage to the reference voltage. For example, when the minimum operating time after the power mode is switched from the power saving mode to the normal mode is five minutes, the threshold voltage may be a value obtained by measuring a battery voltage $\Delta V$ that reduces after the electronic apparatus 200a operates for five minutes in the normal mode and then adding the battery voltage $\Delta V$ to the reference voltage corresponding to the normal mode. The minimum operating time may be a value set in advance or a value settable by the user.

When the switching condition is the condition that a battery remaining amount is at least a threshold capacity, the switching determination unit 24 compares a battery remaining amount received from the communication unit 20a with a threshold capacity stored in advance in the ROM 27. The switching determination unit 24 determines that the switching condition for switching to the normal mode is satisfied when the battery remaining amount is at least the threshold capacity. The switching determination unit 24 determines that the switching condition for switching to the normal mode is not satisfied when the battery remaining amount is less than the threshold capacity. The threshold capacity may be a value higher than a reference capacity with which the electronic apparatus 200a performs shutdown processing in the normal mode. The threshold capacity may be, for example, one obtained by adding an offset capacity, which is based on the minimum operating time of the electronic apparatus 200a after the power mode is switched to the normal mode, to the reference capacity. More specifically, the offset capacity may be determined on the basis of the operating time of the electronic apparatus 200a before the battery capacity in the normal mode reduces from the threshold capacity to the reference capacity.

When the switching condition is the condition that a remaining time is at least a threshold remaining time, the switching determination unit 24 compares a remaining time after the power mode is switched to the normal mode with a threshold time stored in advance in the ROM 27. The remaining time is calculated according to the method described in the first embodiment. The switching determination unit 24 determines that the switching condition for switching to the normal mode is satisfied when the remaining time is at least the threshold remaining time. The switching determination unit 24 determines that the switching condition for switching to the normal mode is not satisfied when the remaining time is less than the threshold remaining time. The threshold remaining time may be, for example, a minimum operating time after the switching of the power mode.

In S603 of FIG. 6, the power mode switching unit 25a determines whether instructions to switch a power mode have been received from the user. Specifically, the power mode switching unit 25a determines whether instructions to switch to the normal mode have been received during an operation in the power saving mode. The processing proceeds to step S605 when the power mode switching unit 25a has received the instructions to switch to the normal mode. Otherwise, the processing proceeds to step S606.

In step S604, the display unit 11 displays the normal mode as a state that is not selectable. For example, the display unit 11 displays a power mode switching display menu itself as a state that is not selectable. Note that the display unit 11 may display the normal mode as a state that is not selectable although the power mode switching display menu is selectable. The state that is not selectable is, for example, a state that is displayed but is not selectable, i.e., a state that is displayed in grayout. Note that the display unit 11 may display the switching display menu or the normal mode to the user so as not to be selectable through an icon or the like or may not display the switching display menu or the normal mode other than displaying the same in grayout. Further, for example, when receiving a power mode that is not selectable, the display unit 11 may display a message screen to notify the user of the fact that the power mode is not selectable. Further, for example, the display unit 11 may display the ON and OFF of the power saving mode instead of displaying the alternatives of the normal mode and the power saving mode. When displaying the ON and OFF of the power saving mode, the display unit 11 may display the OFF of the power saving mode as a state that is not selectable according to the determination result of the switching determination unit 24. Note that the display method is not limited to the above methods but is only required to be a display method with which the user is notified of the fact that a change in a power mode having power consumption higher than that of a present power mode is not allowed. Like this, switching to a power mode having higher power consumption is suppressed in a state in which supplied power is short. Thus, the electronic apparatus 200a is able to prevent its immediate shutdown due to the shortage of power supplied from the battery that may occur along with the switching of a power mode.

In step S605, the calculation method change unit 22 changes a calculation method for calculating the remaining time of the electronic apparatus 200a according to the power mode to which the power mode switching unit 25a has been instructed to switch in step S603. The calculation method change unit 22 changes the correction coefficient k used to calculate the remaining time from the value of the power saving mode to the value of the normal mode.

In step S606, the remaining time acquisition unit 21 calculates the remaining time of the electronic apparatus 200a using the calculation method described in the first embodiment. The processing of steps S601 to S606 is repeatedly executed at a prescribed interval during the operation of the electronic apparatus 200a.

Figure 8:
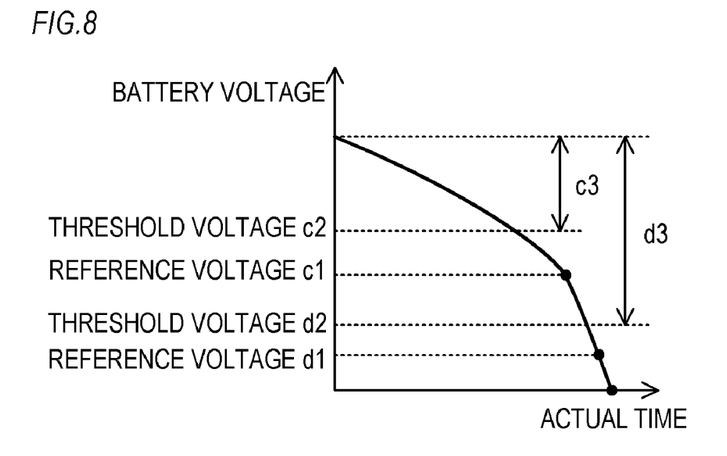
FIG. 8 is a diagram for describing the determination of a power mode switching condition when the electronic apparatus 200a has three power modes.

In FIG. 8, processing when the electronic apparatus 200a has three power modes will be described. In FIG. 7, a case in which the electronic apparatus 200a has the two power modes of the normal mode and the power saving mode is described as an example. However, the above method is also applicable to a case in which the electronic apparatus 200a has at least three power modes. For example, the electronic apparatus 200a has the three power modes of a normal mode, a first power saving mode, and a second power saving mode in descending order of power consumption. In this case, the electronic apparatus 200a performs shutdown processing when its battery voltage drops to a reference voltage c1 in the normal mode, and performs the shutdown processing when the battery voltage drops to a reference voltage d1 in the first power saving mode.

The switching determination unit 24 compares the battery voltage with a threshold voltage c2 and determines whether a condition for switching from the first power saving mode or the second power saving mode to the normal mode is satisfied. Further, the switching determination unit 24 compares the battery voltage with a threshold voltage d2 and determines whether a condition for switching from the second power saving mode to the first power saving mode is satisfied. The switching determination unit 24 determines that the condition for switching from the first power saving mode or the second power saving mode to the normal mode is satisfied when the battery voltage is at least a threshold voltage c2 (falls withing the range of c3 in FIG. 8). The switching determination unit 24 determines that the condition for switching from the second power saving mode to the first power saving mode is satisfied when the battery voltage is at least a threshold voltage d2 (falls withing the range of d3 in FIG. 8). The power mode switching unit 25a outputs a display content to the display unit 11 so that a power mode, which is determined as being not satisfying the switching condition for switching the power mode by the switching determination unit 24, is displayed as a state that is not selectable through, for example, a grayout display or the like. When the electronic apparatus 200a has at least the three power modes as described above, the electronic apparatus 200a is able to prevent its shutdown immediately after the switching of the power modes. Note that even when the electronic apparatus 200a has at least the three power modes, a condition used by the switching determination unit 24 to make a determination is not limited to the comparison of a battery voltage but may include other conditions such as the comparison of a battery remaining amount and the comparison of the remaining time of the electronic apparatus 200a like the case in which the electronic apparatus 200a has the two power modes. Note that when the electronic apparatus 200a has at least the three power modes, the switching determination unit 24 is able to determine that a condition for switching is satisfied as for switching from the normal mode to the first power saving mode or the second power saving mode and switching from the first power saving mode to the second power saving mode.

According to the second embodiment, the electronic apparatus 200a is able to prevent its shutdown immediately after the switching of a power mode due to the shortage of power supplied from the battery.

Third Embodiment

At least one of the various functions, processing, and methods described in the above embodiment may be realized when a personal computer, a micro computer, a CPU, or a micro processor executes a program. Hereinafter, a personal computer, a micro computer, a CPU, or a micro processor will be called a "computer X" in a third embodiment. In the third embodiment, a program for controlling the computer X and realizing at least one of the various functions, processing, and methods described in the above embodiments will be called a "program Y".

At least one of the various functions, processing, and methods described in the above embodiments is realized when the computer X executes the program Y. In this case, the program Y is supplied to the computer X via a computer-readable storage medium. The computer-readable storage medium in the third embodiment includes at least one of a hard disk device, a magnetic storage device, an optical storage device, a magneto-optical storage device, a memory card, a volatile memory, and a non-volatile memory. The computer-readable storage medium in the third embodiment is a non-transitory storage medium.

According to the present disclosure, it is possible to suppress the shortening of the usable time of an electronic apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-125971, filed on Jul. 30, 2021, which is hereby incorporated by reference herein in its entirety.

What is claimed is:

1. An electronic apparatus comprising:
at least one processor; and
at least one memory storing a program which, when executed by the at least one processor, causes the electronic apparatus to function as:
a setting unit configured to set a power mode of the electronic apparatus from among a plurality of power modes including a first power mode and a second power mode having maximum power consumption lower than maximum power consumption of the first power mode;
a determination unit configured to determine, on a basis of a present power mode set by the setting unit, a calculation method for calculating a remaining time which is a remaining usable time of the electronic apparatus; and
an acquisition unit configured to acquire the remaining time of the electronic apparatus from information on a remaining amount of a battery acquired from the battery supplying power to the electronic apparatus by using the calculation method determined by the determination unit, wherein
the setting unit performs switching of the power mode from the second power mode to the first power mode according to an instruction from a user in a case where a switching condition for switching to the first power mode is satisfied, and does not perform the switching of the power mode from the second power mode to the first power mode according to the instruction in a case where the switching condition for switching to the first power mode is not satisfied.

2. The electronic apparatus according to claim 1, wherein the program, when executed by the at least one processor, further causes the electronic apparatus to function as a reception unit configured to receive an instruction to set the power mode of the electronic apparatus from the user, wherein the reception unit receives the instruction to set the power mode in a case where the switching condition for switching to the first power mode is satisfied, and does not receive the instruction to set the power mode in a case where the switching condition for switching to the first power mode is not satisfied.

3. The electronic apparatus according to claim 1, wherein
the acquisition unit calculates the remaining time so that the remaining time becomes zero when a voltage of the battery drops to a reference voltage, and
the determination unit determines the calculation method so that the remaining time becomes zero when the voltage of the battery drops to a first reference voltage in the first power mode, and becomes zero when the voltage of the battery drops to a second reference voltage lower than the first reference voltage in the second power mode.

4. The electronic apparatus according to claim 3, wherein the program, when executed by the at least one processor, further causes the electronic apparatus to function as a control unit configured to shut down the electronic apparatus in a case where the remaining time acquired by the acquisition unit becomes zero.

5. The electronic apparatus according to claim 3, wherein
the determination unit determines a correction coefficient to be used in the calculation method according to the present power mode, and
the acquisition unit acquires the remaining time of the electronic apparatus by using the information on the remaining amount of the battery and the correction coefficient.

6. The electronic apparatus according to claim 5, wherein
the information on the remaining amount of the battery includes information on at least one of a remaining amount of the battery, a voltage of the battery, and a current of the battery.

7. The electronic apparatus according to claim 1, wherein
the switching condition for switching to the first power mode includes that a voltage of the battery shown by the information on the remaining amount of the battery is at least a threshold voltage.

8. The electronic apparatus according to claim 7, wherein
the threshold voltage is a voltage based on a time at which the electronic apparatus is required to operate in the first power mode after the power mode of the electronic apparatus is switched to the first power mode.

9. The electronic apparatus according to claim 1, wherein
the switching condition for switching to the first power mode includes that a remaining amount of the battery shown by the information on the remaining amount of the battery is at least a threshold capacity.

10. The electronic apparatus according to claim 9, wherein
the threshold capacity is a capacity based on a time at which the electronic apparatus is required to operate in the first power mode after the power mode of the electronic apparatus is switched to the first power mode.

11. The electronic apparatus according to claim 1, wherein
the switching condition for switching to the first power mode includes that the remaining time of the electronic apparatus is at least a threshold remaining time.

12. The electronic apparatus according to claim 11, wherein
the threshold remaining time is a time based on a time at which the electronic apparatus is required to operate in the first power mode after the power mode of the electronic apparatus is switched to the first power mode.

13. The electronic apparatus according to claim 1, wherein
at least one of functions usable in the first power mode is disabled in the second power mode.

14. The electronic apparatus according to claim 1, further comprising a display, wherein
the remaining time of the electronic apparatus acquired by the acquisition unit is displayed on the display.

15. A control method for controlling an electronic apparatus, the method comprising:
setting a power mode of the electronic apparatus from among a plurality of power modes including a first power mode and a second power mode having maximum power consumption lower than maximum power consumption of the first power mode;
determining, on a basis of a present power mode set in the setting, a calculation method for calculating a remaining time which is a remaining usable time of the electronic apparatus; and
acquiring the remaining time of the electronic apparatus from information on a remaining amount of a battery acquired from the battery supplying power to the electronic apparatus by using the calculation method determined in the determining, wherein
in the setting, switching of the power mode from the second power mode to the first power mode according to an instruction from a user is performed in a case where a switching condition for switching to the first power mode is satisfied, and the switching of the power mode from the second power mode to the first power mode according to the instruction is not performed in a case where the switching condition for switching to the first power mode is not satisfied.

16. A non-transitory computer readable medium that stores a program, wherein the program causes a computer to execute a control method of an electronic apparatus, the control method comprising:
setting a power mode of the electronic apparatus from among a plurality of power modes including a first power mode and a second power mode having maximum power consumption lower than maximum power consumption of the first power mode;
determining, on a basis of a present power mode set in the setting, a calculation method for calculating a remaining time which is a remaining usable time of the electronic apparatus; and
acquiring the remaining time of the electronic apparatus from information on a remaining amount of a battery acquired from the battery supplying power to the electronic apparatus by using the calculation method determined in the determining, wherein
in the setting, switching of the power mode from the second power mode to the first power mode according to an instruction from a user is performed in a case where a switching condition for switching to the first mode is satisfied, and the switching of the power mode from the second power mode to the first power mode according to the instruction is not performed in a case where the switching condition for switching to the first power mode is not satisfied.

* * * * *